United States Patent [19]

Truskolaski

[11] Patent Number: 5,118,158
[45] Date of Patent: Jun. 2, 1992

[54] CONVERTIBLE TOP LINKAGE ASSEMBLY WITH LATERALLY MOVING REAR QUARTER WINDOWS

[75] Inventor: John E. Truskolaski, Wyandotte, Mich.

[73] Assignee: ASC Incorporated, Southgate, Mich.

[21] Appl. No.: 663,552

[22] Filed: Mar. 4, 1991

[51] Int. Cl.⁵ ............................................. B60J 7/12
[52] U.S. Cl. .................................. 296/107; 296/146; 296/116; 296/201
[58] Field of Search ............... 296/107, 146, 116, 117, 296/121, 122, 201

[56] References Cited

U.S. PATENT DOCUMENTS

| | | | |
|---|---|---|---|
| 3,536,354 | 10/1970 | Ingram | 296/107 X |
| 4,573,732 | 3/1986 | Muscat | 296/108 |
| 4,778,215 | 10/1988 | Ramaciotti | 296/201 X |
| 4,784,428 | 11/1988 | Moy et al. | 296/107 |
| 4,828,317 | 5/1989 | Muscat | 296/107 X |
| 5,004,291 | 4/1991 | Bauer et al. | 296/116 |

FOREIGN PATENT DOCUMENTS

| | | | |
|---|---|---|---|
| 0060724 | 5/1981 | Japan | 296/201 |
| 0230824 | 12/1984 | Japan | 296/201 |
| 656225 | 8/1951 | United Kingdom | 296/116 |

Primary Examiner—Dennis H. Pedder
Attorney, Agent, or Firm—Harness, Dickey & Pierce

[57] ABSTRACT

A convertible top linkage assembly incorporating a retractable rear quarter window which is coupled to the linkage assembly by an attachment and a pivot that allow the window to simultaneously pivot and to displace laterally. A displacing mechanism is used to laterally position the window and set it against a corresponding seal as the convertible top linkage assembly is raised and lowered.

27 Claims, 4 Drawing Sheets

CONVERTIBLE TOP LINKAGE ASSEMBLY WITH LATERALLY MOVING REAR QUARTER WINDOWS

BACKGROUND AND SUMMARY OF THE INVENTION

The present invention relates generally to automobile convertible tops and more particularly to an improved convertible top linkage assembly which provides for laterally outward travel of rear quarter windows attached thereto in order to facilitate sealing.

The present invention is well-suited for vehicles utilizing rear quarter windows that retract with the convertible top linkage assembly. Generally, when a retractable quarter window is in the upright position, it is desirous to have it seat against an exterior seal. This seal is typically attached to a body panel of the vehicle and is employed to prevent undesirous elements from accessing the interior of the vehicle.

Achieving a proper seal is a function of the window's ability to seat against this exterior seal. Traditionally, when these types of quarter windows are raised and retracted, they travel in a generally vertical plane approximately parallel to the longitudinal axis of the vehicle. The corresponding exterior seal is also parallel to the longitudinal axis and is primarily a horizontal rubber-like strip that protrudes inwardly from a body panel toward the quarter window. Accordingly, as the quarter window is raised into position, outward lateral movement is desirable to seat the quarter window against the seal. This minimizes rubbing of the window on the seal, and also permits the use of a top mechanism which is relatively narrow in width and is thus storable in the rearwardly narrowing body opening.

The present invention provides a convertible top linkage assembly that incorporates a novel displacing means which laterally displaces the quarter window outwardly, thereby seating it against the exterior seal. The displacing means is a series of staggered rollers attached to a vehicle body panel. As the quarter window is being raised and approaches the fully upright position, its front edge strikes the first roller and rolls outwardly off the roller as the window continues to move forward. The window then strikes the next roller and is further displaced outwardly. Accordingly, the rollers facilitate a progressive outward displacement of the quarter window that accurately seats it against the exterior seal.

Additional advantages and features of the present invention will become apparent from the subsequent description and the claims taken in conjunction with the accompanying drawings.

DESCRIPTION OF THE PREFERRED EMBODIMENT

Figure 1:
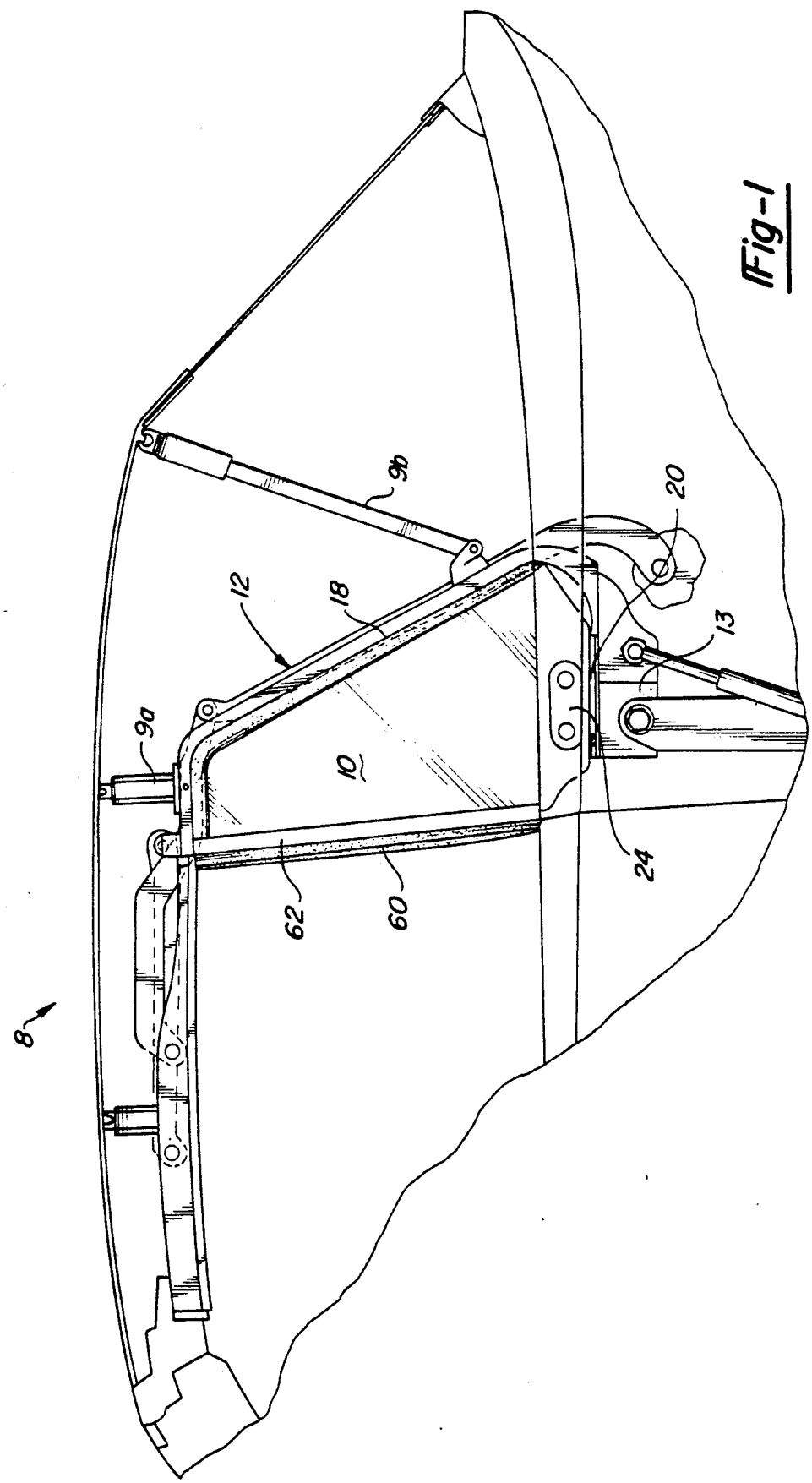
FIG. 1 is a diagrammatic representation showing a typical convertible top linkage assembly with a retractable quarter window in accordance with the principles of the present invention.

Referring now to the drawings and in particular to FIG. 1, the coupling of a rear quarter window 10 to a portion of a typical convertible top linkage assembly 8 is shown. The quarter window 10 is coupled to support means, hereinafter referred to as a support 12, within the linkage assembly 8. This support 12 is adaptable to fit a variety of typical linkage assemblies such as the exemplary one depicted in FIG. 1. Generally, the lower end of the support 12 is pivotally mounted on the vehicle by a generally horizontal pivot 17 that is transverse to the vehicle such that the support member 12 rotates within the linkage assembly 8 in a single plane. Since the support members 12 rotate in a single plane, a plurality of top fabric supporting bows 9a and 9b can be rigidly attached to the support members 12.

Figure 2:
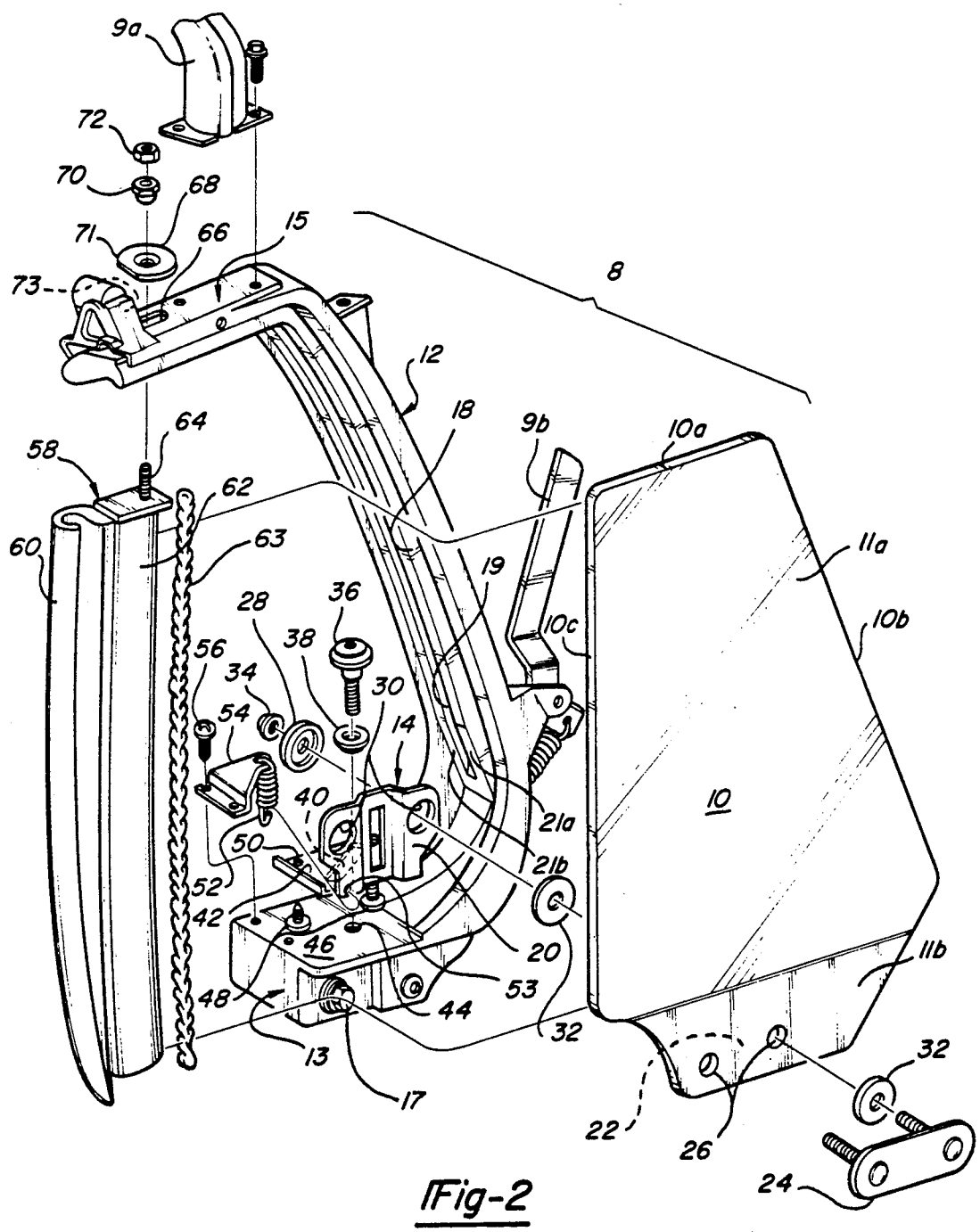
FIG. 2 is an exploded perspective view showing how a rear quarter window can be attached to a typical convertible top linkage assembly in accordance with the principles of the present invention.

As shown in FIG. 2, the support 12 spans the height of the quarter window 10 and couples to an upper and a lower portion of the quarter window 11a and 11b. A guide means is used to couple the lower portion of the quarter window 11b to a lower portion 13 of the support 12 and a pivot means couples the upper portion of the quarter window 11a to an upper portion 15 of the support 12. In the preferred embodiment, the guide means includes a guide 14 having a vertical surface 20 parallel with the quarter window 10 and a horizontal surface 42 parallel with the top of portion 13 of support 12. The vertical surface 20 of the guide 14 has a plurality of bores 30 that correspond with a plurality of bores 26 in the quarter window 10. A fastening means 24 passes through these corresponding bores 26 and 30 through a washer 28, and engages with retaining means such as a nut 34. Soft grommets 32 are incorporated with the fastening means 24 to avoid stressing the window material. Accordingly, the quarter window 10 and the attachment member 14 are rigidly affixed to one another and move as a single member.

The guide 14 is coupled to the support 12 with a pin-like means comprising a bolt 36 that passes through a slot 40 in the guide's horizontal surface 42. This bolt 36 passes through both a washer 38 and the slot 40 before engaging with a threaded bore 44 in the support 12. Once the bolt 36 is engaged, the guide 14 can pivot about the bolt 36 and/or traverse laterally with respect to the bolt 36 as constrained by the slot 40. Since the guide 14 and the quarter window 10 are affixed and move in unison, the lower portion of the quarter window 11b is also able to pivot and/or traverse laterally.

At the upper portion 15 of the support 12 a universal pivot means couples the quarter window 10 to the support 12. In the preferred embodiment, a vertically extending threaded shaft 64 is affixed to a trim member 58 and projects above the upper edge 10(a) of the quarter window. This threaded shaft 64 passes through an elongated vertical bore 66 in the upper portion of the pillar link 15, a concave hemispherical washer 68, a convex hemispherical spacer 70 and engages with a nut 72. As the nut 72 is tightened, the convex hemispherical spacer 70 seats downwardly into a corresponding hemispherical depression in the concave washer 68. The result is a ball and socket type joint where the convex spacer 70, and the threaded shaft 64 passing through it, pivot universally within the hemispherical depression of the concave washer 68.

In the preferred embodiment, the trim member 58 has a seal portion 60 that is made of an elastomeric seal material. This seal portion 60 seats against the side door window when the quarter window 10 is raised. The trim member 58 also incorporates a structural facia member 62 that is attached to the leading edge of the quarter window 10c with an adhesive sealer 63. This structural facia member 62 adds support to the quarter window 10 as it enhances the vehicle's decorative appearance by appearing to be an actual pillar member between the door window (not shown) and the rear quarter window. Moreover, in the preferred embodiment the structural facia member 62 also provides a location for mounting the threaded shaft 64 embodied in the pivot means. Since the quarter window 10 is rigidly affixed to the threaded shaft 64, it also shares the freedom to pivot universally. The only constraint on this universal pivotability is the clearance between the threaded shaft 64 and the elongated bore 66. Therefore, to the extent that the threaded shaft 64 is free to pivot within the elongated bore 66, the quarter window 10 is free to pivot correspondingly. To prevent the concave washer 68 from inadvertently pivoting on the support 12 as it is forced downwardly against the support 12 when the nut 72 is tightened, washer 68 has a flat portion 71 on its circumference that abuts with a corresponding flat portion 73 on the support 12. These measures insure that the concave washer 68 remains stationary on the support 12 as the quarter window 10 pivots.

The quarter window 10 is further retained on the support 12 by a resilient seal means partially disposed within the support 12. In the preferred embodiment, this resilient seal means is in the form of a slotted elastomeric seal 18 having a slot 19 in which the quarter window's upper and rearward edges 10a and 10b seat. The slot 19 embodied in the seal 18 is defined by flexible walls 21a and 21b. These walls 21a and 21b are sufficiently flexible to allow limited lateral and pivotal displacement of the quarter window 10 without losing seal integrity, thereby protecting the vehicle interior from an exterior environment.

In addition to the seal 18, the quarter window 10 may also be held in position by a tension spring 52. In the preferred embodiment, one end of the tension spring 52 is attached to a hole 53 in the guide 14. The opposite end of the spring 52 attaches to a bracket 54 that is fastened, by bolts 56, to the support 12. The bracket 54 anchors the spring 52 as it applies tension and loads the guide 14. Since one end of the spring 52 is attached to the bore 53, the attachment member is loaded generally through that bore 53 in the direction of the spring 52. This loading creates a moment on the guide 14, tending to pivot the guide 14 about the bolt 36. As a result, the forward edge of the guide 14 pivots inward about the bolt 36 as the rearward edge simultaneously pivots outwardly. Since the guide 14 and the quarter window 10 are fixedly attached and move generally as a single member, the forward edge of the quarter window 10c also pivots inward. As the forward edge 10c pivots inward about the bolt 36, the rearward edge of the quarter window 10b pivots outwardly. This causes the rearward edge 10b to seat firmly against the outboard wall 21b of the seal 18. As a result, the quarter window 10 is held in place and not permitted to move about or rattle as it is retained on the support 12. The initial orientation of the guide 14, and the corresponding orientation of the quarter window 10, can be adjusted by turning adjustment screws 48 located between the horizontal surface of the attachment member 42 and the support 12. The heads on these screws 48 are plastic and rest on top of the pillar link's horizontal surface 46 as they upwardly engage threaded bores 50 in the guide 14. As the guide 14 pivots and laterally displaces, the heads on the plastic adjustment screws 48 ride on this horizontal surface 46 and prevent the guide 14 from rubbing against it. This impedes friction and wear that would otherwise occur between the guide 14 and the support 12.

The orientation of the guide 14, and consequently the quarter window 10, can be adjusted by turning these plastic adjustment screws 48. As the adjustment screws 48 are turned, the horizontal surface of the attachment member 42 is forced either upward or downward. Accordingly, the position of the quarter window 10 is correspondingly forced upward or downward. For example, by unscrewing the adjustment screws 48, the length of the adjustment screw increases between the guide 14 and the pillar link's surface 46. This causes the guide 14 to be forced upward relative to the pillar link's surface 46 and as a result, the quarter window 10 is raised relative to the pillar link. Alternatively, if one adjustment screw 48 is varied more than the other, then the quarter window 10 will tilt forward or rearward as desired.

One of the unique features of the present invention is the provision of a unique displacing means for forcing the quarter window 10 outwardly with respect to the support 12 as the top is raised. Outward movement of the quarter window 10 is desired when the convertible top linkage assembly 8 is raised. This allows the quarter window to seat properly against an exterior sealing means.

Figure 3:
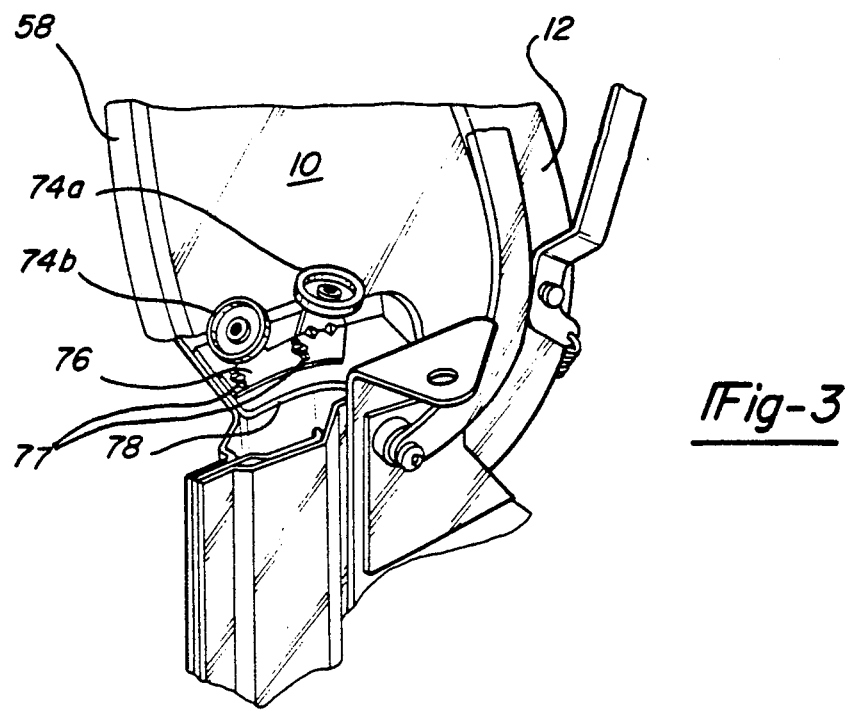
FIG. 3 is a perspective view from the vehicle interior showing the rear quarter window's position as it strikes the first roller of applicant's mechanism and begins to be displaced outwardly.
Figure 4:
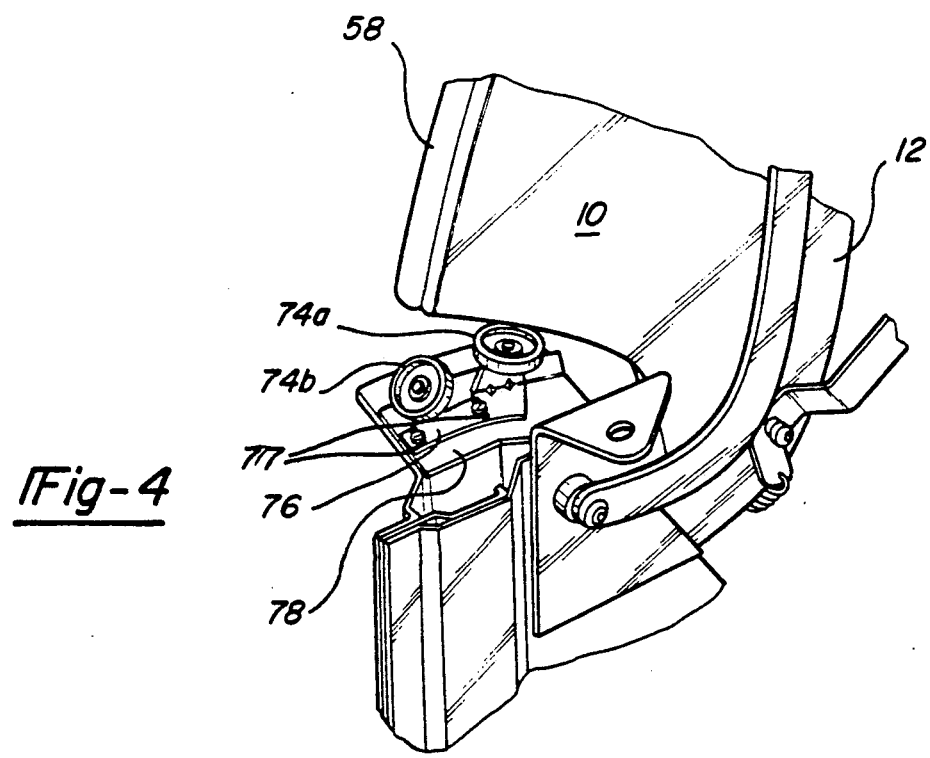
FIG. 4 is a perspective view from the vehicle interior showing the rear quarter window in a fully raised position, completely displaced by two rollers.
Figure 5:
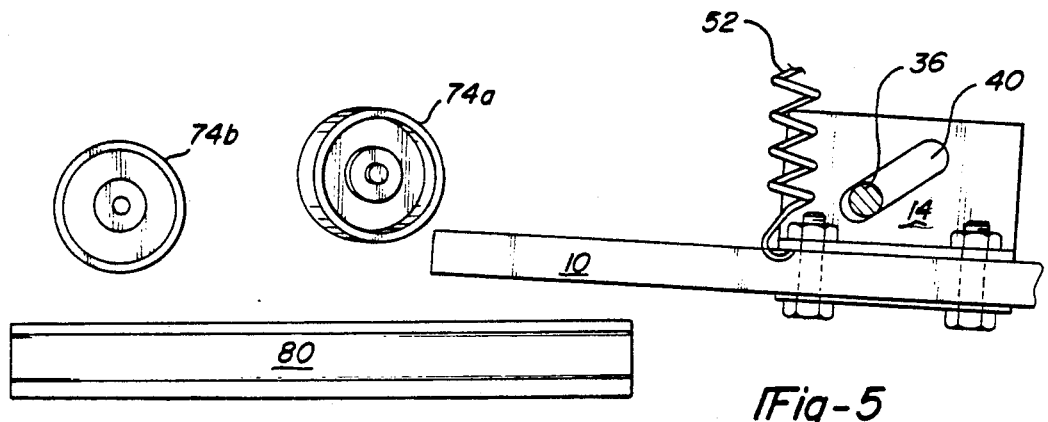
FIGS. 5-7 are diagrammatic representations of the rear quarter window striking the rollers and being progressively displaced outwardly, thereby seating against the exterior seal.
Figure 6:
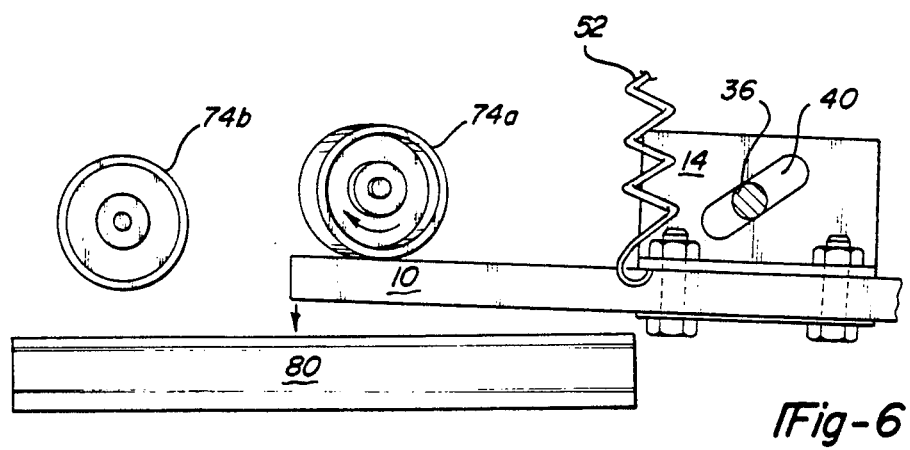
Figure 7:
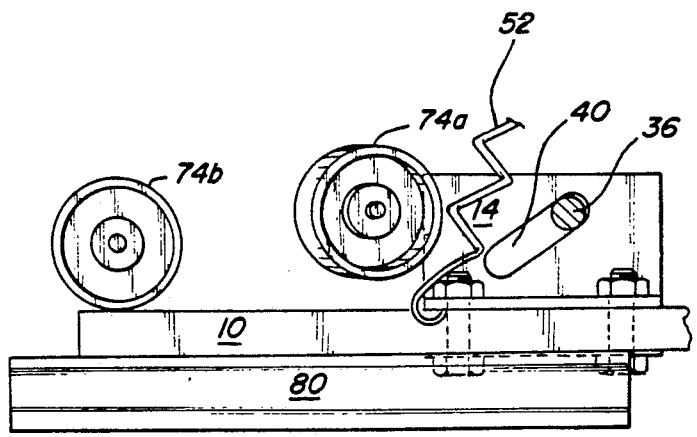

As shown in FIGS. 3-7, the preferred embodiment employs a plurality of rollers 74a and 74b which have been discovered to function in an excellent manner as lateral displacing means. FIGS. 3 and 5 show the quarter window 10 at or just before the point of making initial contact with the first roller 74a as the linkage assembly is raised; and FIGS. 3 and 7 show the quarter window 10 in the fully-raised position, completely displaced by both the first roller 74a and then the second roller 74b. To achieve this position, the forward edge of the quarter window 10c makes contact with the first roller 74a, as shown in FIG. 2, and rolls outwardly off this first roller 74a. The forward edge of the quarter window 10c then contacts the second roller 74b and further rolls outwardly as the quarter window 10 continues to raise. Referring to FIGS. 5-7, this lateral displacement of the quarter window 10 is shown diagrammatically as the top is raised to the upright position. As noted, FIG. 5 depicts the quarter window 10 about to initiate contact with the first roller 74a. FIG. 6 depicts the quarter window 10 in full contact with the first roller 74a after rolling outward and being displaced toward an exterior seal 80. FIG. 6 also depicts the quarter window 10 pivoting about the pin-like means 36, and the latter's simultaneous lateral movement in slot 40. FIG. 7 depicts the quarter window 10 in the fully upright position. In this position, the quarter window 10 has made contact with, and rolled past, the second roller 74b and is completely outwardly displaced. Also note that the quarter window 10 has continued to pivot about the pin-like means, and has further displaced laterally via the slot 40. FIG. 7 also depicts the quarter window 10 fully seated against the exterior window seal 80.

As shown in FIGS. 3 and 4, the rollers 74a and 74b are attached to a bracket 76 which is fixedly attached to a vehicle body panel 78. Note the orientation of the rollers 74a and 74b are at different angles to one another. These angles are predetermined such that as the quarter window 10 is raised or retracted, the glass in immediate contact with the rollers 74a and 74b travels generally in a radial plane of the rollers 74a and 74b, and tangential to the rollers 74a and 74b. This permits the rollers 74a and 74b to roll smoothly along the surface where they contact the quarter window 10. Note that the positioning of the mounting bracket 76, and thus the rollers, is adjustable with respect to the vehicle body panel 78 by utilizing slots 77 for bolting the mounting bracket 76 to the vehicle body panel 78. Thus, rollers 74a and 74b can be adjusted to set the final position of the quarter window 10 as desired.

While it will be apparent that the preferred embodiment of the invention disclosed is well calculated to provide the advantages above stated, it will be appreciated that the invention is susceptible to modification, variation and change without departing from the proper scope or fair meaning of the subjoined claims.

I claim:

1. For a convertible top linkage assembly, improved means for mounting a retractable rear quarter window, comprising:
   (a) support means connected to the linkage assembly for supporting said quarter window so that it will raise and lower simultaneously with said linkage assembly;
   (b) universal pivot means for coupling the quarter window to the support means, said pivot means allowing said rear quarter window to pivot about a substantially vertical axis that rotates about a point in said support means, thereby allowing a lower portion of the rear quarter window to displace laterally to a limited degree with respect to said support means; and
   (c) displacing means for laterally displacing a front edge of said rear quarter window outwardly with respect to said support means as the support means is raised and for laterally displacing said front edge of said rear quarter window inwardly with respect to said support means as the support means is lowered.

2. The invention of claim 1 wherein said pivot means is disposed at substantially the top of said quarter window.

3. The invention of claim 1 wherein said displacing means comprises at least one roller cam adapted to engage said quarter window when it is raised.

4. The invention of claim 1 wherein said displacing means comprises a pair of roller cams adapted to progressively and sequentially engage said quarter window as it is raised.

5. The invention of claim 1 further comprising guide means for guiding a lower portion of said quarter window along a predetermined path.

6. The invention of claim 5 wherein said guide means includes a pin guided in a slot.

7. The invention of claim 5 wherein said pivot means is disposed adjacent the top of said quarter window and said guide means is disposed adjacent the bottom of said quarter window.

8. The invention of claim 1 wherein resilient seal means is disposed between a rear edge of said quarter window and said support means.

9. The invention of claim 6 wherein an adjusting means is utilized for adjusting said slot to achieve precise displacement of the rear quarter window.

10. The invention of claim 8 wherein a guide means is loaded by a spring creating a moment on the quarter window causing it to pivot, thereby causing the quarter window to load against said resilient seal means.

11. The invention of claim 10 wherein said spring holds the rear quarter window in place while the convertible top linkage assembly is in the retracted position and while the convertible top linkage assembly is being raised and retracted.

12. The invention of claim 10 wherein said rear quarter window has a member fixedly attached to its forward edge for providing a seal between a side door window, and the rear quarter window.

13. The invention of claim 1 wherein said quarter window has a structural facia pillar member between a side door window and said rear quarter window.

14. The invention of claim 3 wherein said at least one roller cam is attached to a body side panel of the vehicle.

15. The invention of claim 3 wherein said at least one roller cam is positioned so that as the rear quarter window is raised or retracted, portions of said window in immediate contact with said at least one roller travel generally in a radial plane of the at least one roller and tangential to said at least one roller.

16. The invention of claim 15 wherein said at least one roller cam comprises a plurality of roller cams and said cams are staggered so that when the rear quarter window strikes a first roller cam and is displaced laterally, it is in position to strike a second roller cam to further displace the quarter window.

17. The invention of claim 3 wherein said at least one roller cam is adjustable so that accurate lateral displacement of the rear quarter window can be achieved.

18. The invention of claim 1 wherein said displacing means laterally displaces the quarter window to cause it to sealingly engage an exterior seal attached to a body side panel.

19. For a vehicle convertible top that can be raised into a position to cover the interior of said vehicle, and lowered into a collapsed storage position, an improved means for positioning a retractable rear quarter window, comprising:
   (a) linkage assembly that provides a frame for said convertible top and is pivotally connected to said vehicle;
   (b) covering means for covering the exterior of said linkage assembly;
   (c) a retractable support member, that rotates within said linkage assembly in a single plane, for supporting said rear quarter window;
   (d) universal pivot means for coupling the quarter window to the support member, said pivot means allowing said rear quarter window to pivot about a substantially vertical axis that rotates about a point in said support member, thereby allowing a lower portion of the rear quarter window to displace laterally to a limited degree with respect to said support member;

(e) displacing means for displacing a front edge of said rear quarter window outwardly with respect to said support member as the support member is raised and for displacing said front edge of said rear quarter window inwardly with respect to said support member as the support member is retracted; and (f) sealing means for sealing said rear quarter window by engagement with the rear quarter window.

20. The invention of claim 19 wherein said quarter window is coupled to a lower portion of said support member by a guide means.

21. The invention of claim 20 wherein said guide means guides the lower portion of said quarter window along a predetermined path.

22. The invention of claim 20 wherein said guide means includes a pin guided in a slot.

23. The invention of claim 22 wherein an adjusting means is utilized for adjusting said slot to achieve precise displacement of the window.

24. The invention of claim 19 wherein said sealing means is disposed between the rear edge of said quarter window and said support member.

25. The invention of claim 19 wherein said displacing means is a plurality of roller members that are fixedly attached to the body of the vehicle.

26. The invention of claim 25 wherein said roller members are adjustably positioned so that as the rear quarter window is raised or retracted, portions of said window in immediate contact with said rollers travel generally in a radial plane of the rollers and tangential to said rollers.

27. The invention of claim 25 wherein said plurality of roller members are staggered so that when the rear quarter window strikes the first roller and is displaced laterally, it is in position to strike a second roller member to further displace the quarter window and so on.

* * * * *

UNITED STATES PATENT AND TRADEMARK OFFICE
CERTIFICATE OF CORRECTION

PATENT NO. : 5,118,158
DATED : June 2, 1992
INVENTOR(S) : John E. Truskolaski

It is certified that error appears in the above-identified patent and that said Letters Patent is hereby corrected as shown below:

On the title page, Abstract, line 6, "set" should be --seat--.

Signed and Sealed this

Twenty-first Day of September, 1993

Attest:

BRUCE LEHMAN

Attesting Officer     Commissioner of Patents and Trademarks